US008812662B2

(12) United States Patent
Soroushian et al.

(10) Patent No.: US 8,812,662 B2
(45) Date of Patent: Aug. 19, 2014

(54) SYSTEMS AND METHODS FOR ESTIMATING AVAILABLE BANDWIDTH AND PERFORMING INITIAL STREAM SELECTION WHEN STREAMING CONTENT

(75) Inventors: Kourosh Soroushian, San Diego, CA (US); Jason Braness, San Diego, CA (US)

(73) Assignee: Sonic IP, Inc., Santa Clara, CA (US)

( * ) Notice: Subject to any disclaimer, the term of this patent is extended or adjusted under 35 U.S.C. 154(b) by 0 days.

(21) Appl. No.: 13/341,838

(22) Filed: Dec. 30, 2011

(65) Prior Publication Data

US 2013/0007263 A1     Jan. 3, 2013

Related U.S. Application Data

(60) Provisional application No. 61/502,767, filed on Jun. 29, 2011.

(51) Int. Cl.
| | |
|---|---|
| *G06F 15/173* | (2006.01) |
| *H04L 29/06* | (2006.01) |
| *H04N 21/2662* | (2011.01) |
| *H04N 21/442* | (2011.01) |
| *H04L 12/56* | (2006.01) |
| *H04L 1/00* | (2006.01) |

(52) U.S. Cl.
CPC .............. *H04L 47/12* (2013.01); *H04L 65/607* (2013.01); *H04N 21/2662* (2013.01); *H04L 65/1069* (2013.01); *H04N 21/44209* (2013.01); *H04N 21/23493* (2013.01); *H04L 65/80* (2013.01); *H04L 1/0002* (2013.01)
USPC ........... 709/224; 709/223; 709/228; 709/232; 370/241; 370/503; 370/465

(58) Field of Classification Search
CPC ......... H04L 47/12; H04L 47/10; H04L 47/11; H04L 47/14; H04L 47/125
USPC ......................................... 709/224
See application file for complete search history.

(56) References Cited

U.S. PATENT DOCUMENTS

| | | | |
|---|---|---|---|
| 2007/0086485 A1 | 4/2007 | Vega-Garcia et al. | |
| 2009/0144425 A1* | 6/2009 | Marr et al. | 709/226 |
| 2009/0300203 A1* | 12/2009 | Virdi et al. | 709/231 |

FOREIGN PATENT DOCUMENTS

WO     2013002835 A1     1/2013

OTHER PUBLICATIONS

International Search Report and Written Opinion for Application PCT/US2011/68264, Report Completed on Mar. 30, 2012, 6 pgs.

* cited by examiner

*Primary Examiner* — Tauqir Hussain
(74) *Attorney, Agent, or Firm* — KPPB LLP

(57) ABSTRACT

Systems and methods for determining available bandwidth and performing initial stream selection when commencing adaptive bitrate streaming using Hypertext Transfer Protocol (HTTP) in accordance with embodiments of the invention are disclosed. One embodiment of the invention includes measuring network bandwidth using a playback device, determining an initial network bandwidth estimate using the network bandwidth measurements, selecting an initial stream from said plurality of streams of encoded media that are encoded at different maximum bitrates rates using the playback device based upon the maximum bitrates of the plurality of streams and the initial bandwidth estimate; and commencing streaming of encoded media by requesting portions of the encoded media from the initial streams using the playback device.

38 Claims, 6 Drawing Sheets

SYSTEMS AND METHODS FOR ESTIMATING AVAILABLE BANDWIDTH AND PERFORMING INITIAL STREAM SELECTION WHEN STREAMING CONTENT

CROSS REFERENCE TO RELATED APPLICATIONS

This application claims priority to U.S. Provisional Application Ser. No. 61/502,767, entitled "Client-Server Bandwidth Hinting for Adaptive Streaming Enhancements", filed Jun. 29, 2011, the entirety of which is incorporated herein by reference.

FIELD OF THE INVENTION

The present invention generally relates to streaming media and more specifically to selecting an initial stream from a number of streams encoded with different maximum bitrates.

BACKGROUND

The term streaming media describes the playback of media on a playback device, where the media is stored on a server and continuously sent to the playback device over a network during playback. Typically, the playback device stores a sufficient quantity of media in a buffer at any given time during playback to prevent disruption of playback due to the playback device completing playback of all the buffered media prior to receipt of the next portion of media. Adaptive bit rate streaming or adaptive streaming involves detecting the present streaming conditions (e.g. the user's network bandwidth and CPU capacity) in real time and adjusting the quality of the streamed media accordingly. Typically, the source media is encoded at multiple bit rates and the playback device or client switches between streaming the different encodings depending on available resources. When a playback device commences adaptive bitrate streaming, the playback device typically starts by requesting portions of media from the lowest bitrate streams (where alternative streams are available). As the playback device downloads the requested media, the playback device can measure the available bandwidth. In the event that there is additional bandwidth available, the playback device can switch to higher bitrate streams.

Adaptive streaming solutions typically utilize Hypertext Transfer Protocol (HTTP), published by the Internet Engineering Task Force and the World Wide Web Consortium as RFC 2616, to stream media between a server and a playback device. HTTP is a stateless protocol that enables a playback device to request a byte range within a file. HTTP is described as stateless, because the server is not required to record information concerning the state of the playback device requesting information or the byte ranges requested by the playback device in order to respond to requests received from the playback device.

In adaptive streaming systems, the source media is typically stored on a media server as a top level index file pointing to a number of alternate streams that contain the actual video and audio data. Each stream is typically stored in one or more container files. Different adaptive streaming solutions typically utilize different index and media containers. The Synchronized Multimedia Integration Language (SMIL) developed by the World Wide Web Consortium is utilized to create indexes in several adaptive streaming solutions including IIS Smooth Streaming developed by Microsoft Corporation of Redmond, Wash., and Flash Dynamic Streaming developed by Adobe Systems Incorporated of San Jose, Calif. HTTP Adaptive Bitrate Streaming developed by Apple Computer Incorporated of Cupertino, Calif. implements index files using an extended M3U playlist file (.M3U8), which is a text file containing a list of URIs that typically identify a media container file. The most commonly used media container formats are the MP4 container format specified in MPEG-4 Part 14 (i.e. ISO/IEC 14496-14) and the MPEG transport stream (TS) container specified in MPEG-2 Part 1 (i.e. ISO/IEC Standard 13818-1). The MP4 container format is utilized in IIS Smooth Streaming and Flash Dynamic Streaming. The TS container is used in HTTP Adaptive Bitrate Streaming.

SUMMARY OF THE INVENTION

Systems and methods in accordance with embodiments of the invention estimate available bandwidth and perform initial stream selection when commencing streaming of media. One embodiment of the method of the invention includes measuring network bandwidth using a playback device, determining an initial network bandwidth estimate using the network bandwidth measurements, selecting an initial stream from said plurality of streams of encoded media that are encoded at different maximum bitrates rates using the playback device based upon the maximum bitrates of the plurality of streams and the initial bandwidth estimate; and commencing streaming of encoded media by requesting portions of the encoded media from the initial streams using the playback device.

In a further embodiment of the method of the invention, the playback device performs the initial bandwidth estimate using the network bandwidth measurements.

Another embodiment of the method of the invention also includes providing the network bandwidth measurements to a performance server. In addition, the performance server determines the initial bandwidth estimate using the network bandwidth measurements.

In a still further embodiment of the method of the invention, measuring network bandwidth includes requesting a block of data and measuring the time taken to download the data.

In still another embodiment of the method of the invention, measuring network bandwidth includes associating a timestamp with the network bandwidth measurement.

In a yet further embodiment of the method of the invention, measuring network bandwidth includes associating a content distribution network identifier with the network bandwidth measurement.

In yet another embodiment of the method of the invention, measuring network bandwidth includes associating a server IP address with the network bandwidth measurement.

In a further embodiment again of the method of the invention, measuring network bandwidth includes associating a server hostname with the network bandwidth measurement.

In another embodiment again of the method of the invention, measuring bandwidth includes associating a video maximum bitrate with the network bandwidth measurement.

In a further additional embodiment of the method of the invention, determining an initial network bandwidth estimate using the network bandwidth measurements includes determining an average network bandwidth using the network bandwidth measurements.

In another additional embodiment of the method of the invention, the average network bandwidth is determined by filtering the network bandwidth measurements based upon at least one piece of information associated with the network bandwidth measurements selected from the group consisting of time of day, day of week, content distribution network, server, and maximum bitrate.

In a still yet further embodiment of the method of the invention, determining an initial network bandwidth estimate using the network bandwidth measurements further includes determining the accuracy of the initial bandwidth estimate.

In still yet another embodiment of the method of the invention, the initial stream is selected for use in the adaptive bitrate streaming of the encoded media.

In a still further embodiment again of the method of the invention, the initial stream is selected by initially allocating available bandwidth to streams which have no alternative and allocating the remaining bandwidth to the selection from the plurality of streams of encoded media that are encoded at different maximum bitrates rates.

Still another embodiment again of the method of the invention, also includes selecting a stream from each of a number of sets of streams of encoded media that are encoded at different maximum bitrates.

In a still further additional embodiment, the user can instruct the playback device concerning allocation of bandwidth to at least one of the selections subject to the remaining available bandwidth.

A further embodiment of the invention includes a processor configured, via a client application, to request portions of files from a remote server. In addition, the client application further configures the processor to measure network bandwidth using a playback device, obtain an initial network bandwidth estimate using the network bandwidth measurements, select an initial stream from said plurality of streams of encoded media that are encoded at different maximum bitrates rates using the playback device based upon the maximum bitrates of the plurality of streams and the initial bandwidth estimate, and commence streaming of encoded media by requesting portions of the encoded media from the initial streams using the playback device.

In another embodiment, the client application further configures the processor to measure network bandwidth by requesting a block of data and measuring the time taken to download the data.

In a still further embodiment, the client application further configures the processor to associate a timestamp with the network bandwidth measurement.

In still another embodiment, the client application further configures the processor to associate a content distribution network identifier with the network bandwidth measurement.

In a yet further embodiment, the client application further configures the processor to associate a server IP address with the network bandwidth measurement.

In yet another embodiment, the client application further configures the processor to associate a server host name with the network bandwidth measurement.

In a further embodiment again, the client application further configures the processor to associate a video maximum bitrate with the network bandwidth measurement.

In another embodiment again, the client application further configures the processor to associate the playback device IP address with the network bandwidth measurement.

In a further additional embodiment, the client application further configures the processor to perform an initial bandwidth estimate using the network bandwidth measurements.

In another additional embodiment, the client application further configures the processor to determine an initial network bandwidth estimate using the network bandwidth measurements by determining an average network bandwidth using the network bandwidth measurements.

In a still further embodiment, the client application further configures the processor to determine the average network bandwidth by filtering the network bandwidth measurements based upon at least one piece of information associated with the network bandwidth measurements selected from the group consisting of time of day, day of week, content distribution network, server and maximum bitrate.

In still another embodiment, the client application further configures the processor to determine the accuracy of the initial bandwidth estimate.

In a yet further embodiment, the client application further configures the processor to provide the network bandwidth measurements to a performance server, and receive an initial bandwidth estimate from the performance server.

In yet another embodiment, the initial stream is selected for use in the adaptive bitrate streaming of the encoded media.

In a further embodiment again, the client application further configures the processor to select the initial stream by initially allocating available bandwidth to streams which have no alternative and allocating the remaining bandwidth to the selection from the plurality of streams of encoded media that are encoded at different maximum bitrates rates.

In another embodiment again, the client application further configures the processor to select a stream from each of a number of sets of streams of encoded media that are encoded at different maximum bitrates.

A further additional embodiment includes a machine readable medium containing processor instructions, where execution of the instructions by a processor causes the processor to perform a process including measuring network bandwidth using a playback device, obtaining an initial network bandwidth estimate using the network bandwidth measurements, selecting an initial stream from said plurality of streams of encoded media that are encoded at different maximum bitrates rates using the playback device based upon the maximum bitrates of the plurality of streams and the initial bandwidth estimate, and commencing streaming of encoded media by requesting portions of the encoded media from the initial streams using the playback device.

In a still yet further embodiment, execution of the instructions by a processor causes the process to obtain an initial network bandwidth estimate by calculating an initial bandwidth estimate using the network bandwidth measurements.

In still yet another embodiment, execution of the instructions by a processor causes the process to obtain an initial network bandwidth estimate by transmitting the network bandwidth measurements to a server, and receiving an initial bandwidth estimate from the server.

Another further embodiment of the invention includes recording performance data concerning playback of streamed content by a playback device, obtaining a maximum bitrate of a piece of content, comparing the maximum bitrate of the piece of content to recorded performance data for playback of streamed content by the playback device, and verify that the playback device can support playback of content based upon the comparison of the maximum bitrate of the piece of content and the recorded performance data for playback of streamed content by the playback device.

In still another further embodiment, the performance data includes information concerning the amount of time spent buffering streamed content.

In yet another further embodiment, comparing the maximum bitrate of the piece of content to recorded performance data for playback of streamed content by the playback device includes comparing an amount of time spent buffering streamed content encoded at a maximum bitrate corresponding to the maximum bitrate of the piece of content to a predetermined threshold.

In another further embodiment again, the performance data includes information concerning the amount of time spent streaming content streams encoded at different maximum bitrates during adaptive bitrate streaming.

In another further additional embodiment, comparing the maximum bitrate of the piece of content to recorded performance data for playback of streamed content by the playback device includes comparing the proportion of time spent streaming content streams encoded at a maximum bitrate corresponding to the maximum bitrate of the piece of content to a predetermined threshold.

DETAILED DISCLOSURE OF THE INVENTION

Figure 1:
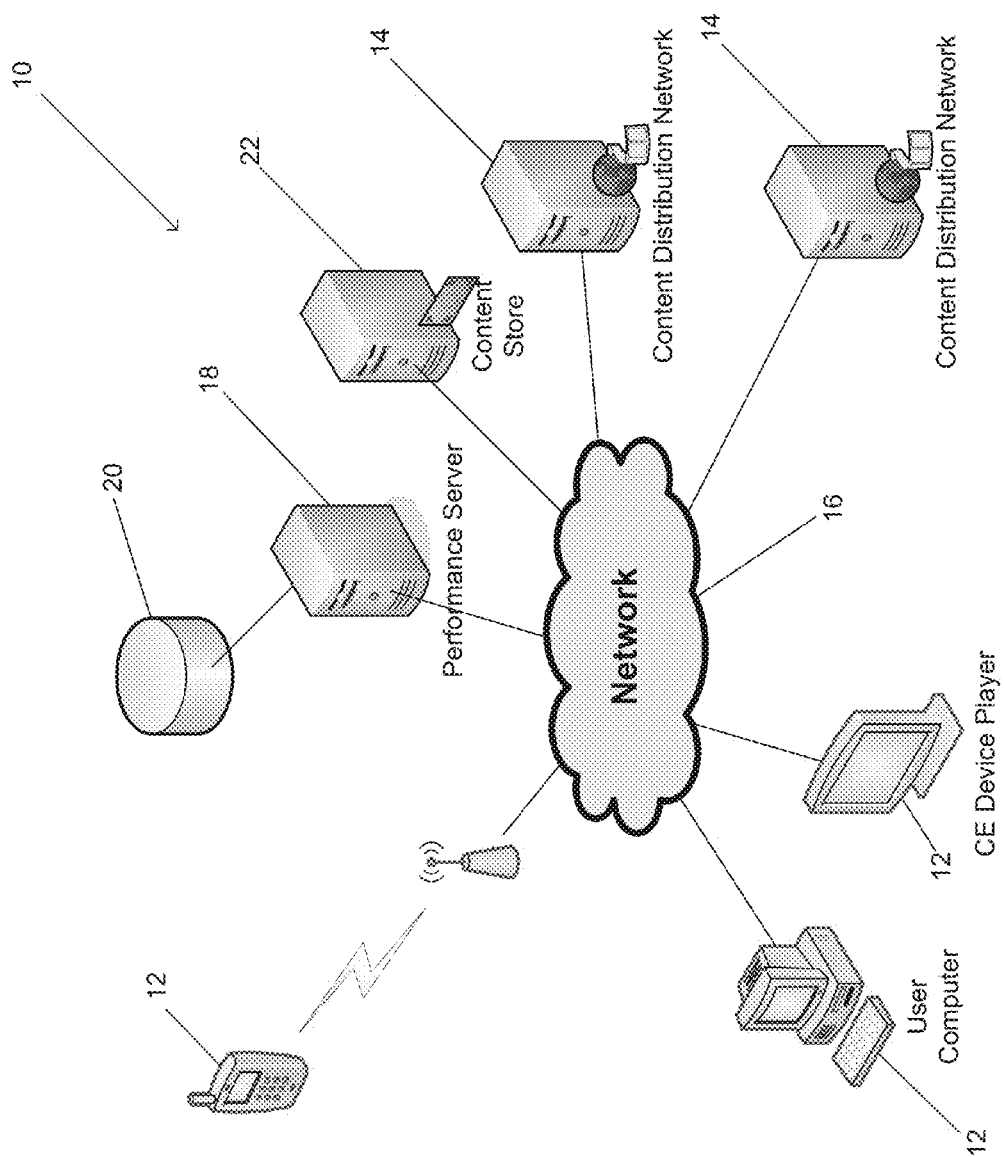
FIG. 1 is a network diagram of a media streaming system including a performance server in accordance with an embodiment of the invention.

Turning now to the drawings, systems and methods for estimating available bandwidth and performing initial stream selection when commencing streaming of media in accordance with embodiments of the invention are illustrated. In many embodiments, playback devices record performance information during the streaming session. When a playback device initiates a new streaming session, previously recorded performance information can be utilized to estimate available bandwidth. The bandwidth estimate can then be used to select between streams encoded at different maximum bitrates for commencement of conventional or adaptive bitrate streaming. Where audio and/or subtitle tracks are only available at a single bitrate, the bitrate of any audio and/or subtitle streams is subtracted from the bandwidth estimate. Where a specific stream such as (but not limited to) a video stream is selected from a number of alternative streams encoded at different maximum bitrates, a video stream is selected having a maximum bitrate equal to or less than the estimated remaining available bandwidth. Where alternative audio and video stream combinations are available, the system can default or rely on user selections to choose either a higher bitrate audio stream or a higher bitrate video stream.

In many embodiments, the historical performance information is utilized to estimate available bandwidth using a technique appropriate to a specific application. In a number of embodiments, the last network bandwidth measurement recorded by a playback device is utilized to generate a bandwidth estimate. In several embodiments, the network bandwidth measurements recorded by a playback device over a predetermined time period are utilized to generate a bandwidth estimate. In many embodiments, correlation between the time of day and the network bandwidth measurements recorded by the playback device can be utilized in determining an initial bandwidth estimate.

In various embodiments, the process of determining a bandwidth estimate also includes providing information concerning the accuracy of the estimate. In many embodiments, one or more accuracy factors are generated that can be utilized in selection of initial streams based upon a bandwidth estimate. Depending on the accuracy factor(s), a playback device can determine the margin to allow between the bandwidth requirements of selected streams and the estimated available bandwidth. In many embodiments, the accuracy factor is determined based upon the correlation between bandwidth estimates made with respect to the playback device and the actual streaming conditions subsequently experienced by the playback device.

In a number of embodiments, playback devices report network bandwidth measurements to a performance server and the performance server makes recommendations concerning initial stream selection. In several embodiments, the playback devices can report back the identity of the content distribution network and/or specific server from which content was streaming at the time the network bandwidth measurement was taken. In addition to providing stream selection recommendations, the performance server can also provide recommendations concerning the specific content distribution network and/or servers from which to stream content to the playback device to achieve the best network performance. By aggregating network performance measurements from multiple playback devices, a performance server in accordance with embodiments of the invention can perform bandwidth estimations and recommendations concerning content distribution networks and/or servers utilizing bandwidth measurements taken from multiple playback devices within a geographic area that utilize the same Internet Service Provider (ISP).

The availability of network bandwidth measurements on a performance server can also enable other possible functionality. In several embodiments, playback devices can purchase content for streaming from online content stores and the price for the same content at different resolutions may vary. In a number of embodiments, the performance server utilizes recorded network bandwidth measurements to determine whether the playback device is likely to experience network bandwidth performance capable of supporting the streaming of the content at a specific resolution. In this way, the recorded performance information can be utilized to make recommendations concerning the purchase of content at different resolutions. In several embodiments, the recommendation can also include an indication of the accuracy or likelihood that the recommendation is correct. In a number of embodiments, an accuracy factor can be generated based upon the total time spent rebuffering content streamed at the recommended level during previous streaming sessions. In many embodiments, an accuracy factor can be generated with respect to an adaptive bitrate streaming system based upon the proportion of time spent streaming below the recommended level during previous streaming sessions. In other embodiments, any of a variety of accuracy metrics can be utilized as appropriate to the requirements of a specific application.

In other embodiments, the performance server can utilize the network bandwidth measurements in any of a variety of ways appropriate to a specific application including but not limited to enabling online content stores to offer premium content not only based upon resolution, but also based upon distribution from a specific content distribution network that has historically achieved higher network performance with respect to a specific playback device. Performance servers and processes for collecting network bandwidth measurements and estimating network bandwidth performance in accordance with embodiments of the invention are discussed further below.

Streaming System Architecture

Streaming systems in accordance with many embodiments of the invention include a server on which content is stored, playback devices that request streaming of content and that perform bandwidth measurements, and a performance server configured to aggregate network bandwidth measurements and to provide bandwidth estimates. A streaming system in accordance with an embodiment of the invention is illustrated in FIG. 1. The streaming system 10 includes a number of playback devices 12 configured to request streaming of content from remote servers within content distribution networks 14 via a network 14 such as the Internet. In many embodiments, the playback devices can select between alternative streams when requesting content. Alternative streams are streams that encode the same media content in different ways. In many instances, alternative streams encode media content (such as but not limited to video) at different maximum bitrates. In a number of embodiments, the alternative streams are encoded with different resolutions and/or at different frame rates. The playback device can select one or more streams for conventional streaming or can switch between alternative streams to perform adaptive bitrate streaming.

During streaming of content, the playback devices 12 perform network bandwidth or data rate measurements. Each network bandwidth measurement can be timestamped and stored locally and/or sent to a performance server 18 that can store the network bandwidth measurement in a database 20. In many embodiments, the playback device sends network bandwidth measurements to the performance server continuously. In a number of embodiments, the playback device sends network bandwidth measurements to the performance server in batches.

When a playback device 12 initiates a new streaming session, previous measurements of network bandwidth made by a playback device can be utilized to estimate the available network bandwidth. Any of a variety of techniques appropriate to a specific application can be utilized to generate a network bandwidth estimate in accordance with embodiments of the invention. The generation of network bandwidth estimates is discussed further below. Based upon the network bandwidth estimate, the playback device can determine the initial streams from which to commence requesting portions of encoded media based upon the maximum bitrates of the available streams. In several embodiments, the network performance server 18 generates the network bandwidth estimate and provides the network bandwidth estimate to the playback device. In a number of embodiments, the network performance server 18 generates a network bandwidth estimate and uses the estimate to provide initial stream selection recommendations to a playback device 12. In many embodiments, the playback device 12 generates the network bandwidth estimate based upon locally stored network bandwidth measurements. As is discussed further below, the process of generating a network bandwidth estimate can also include determining the accuracy of the network bandwidth estimate. In a number of embodiments, the accuracy of a network bandwidth estimate is considered during the initial stream selection.

In several embodiments, playback devices 12 are able to purchase content for streaming via one or more online content stores 22. In many instances, the online content store will provide different pricing for content encoded at different resolutions. For example, a content store can charge a premium for content encoded at high definition resolution relative to content encoded at standard definition resolution. If insufficient network bandwidth is available to a playback device to stream the high definition content, the playback device may prefer to purchase the lower resolution content. In the context of conventional streaming, the playback device will experience frequent buffering interruptions by purchasing the premium content. In the context of adaptive bitrate streaming, the majority of the content received by the playback device likely will be at the lower resolution irrespective of whether the playback device purchases the premium content. In order to reduce the likelihood that a playback device 12 purchases premium content that cannot be supported by the available network bandwidth, the bandwidth available to the playback device can be estimated using the recorded network performance measurements and recommendations provided to the user concerning whether the premium content can be supported. In several embodiments, the process of generating a recommendation also involves determining the likelihood that the recommendation is correct. In a number of embodiments, the servers of the online content store 22 communicate with the performance server 18 to obtain a network performance estimate. In other embodiments, the playback device 12 generates the network performance estimate based upon locally stored records of past network bandwidth measurements.

Although a specific streaming system is illustrated in FIG. 1, performance servers can be incorporated into any of a variety of streaming system architectures where playback devices perform network bandwidth measurements in accordance with embodiments of the invention. In addition, individual playback devices can store network bandwidth measurements and perform network bandwidth estimates in accordance with embodiments of the invention. Playback devices that can be utilized to perform network bandwidth measurements during a streaming session in accordance with embodiments of the invention are discussed further below.

Playback Devices

Figure 2:
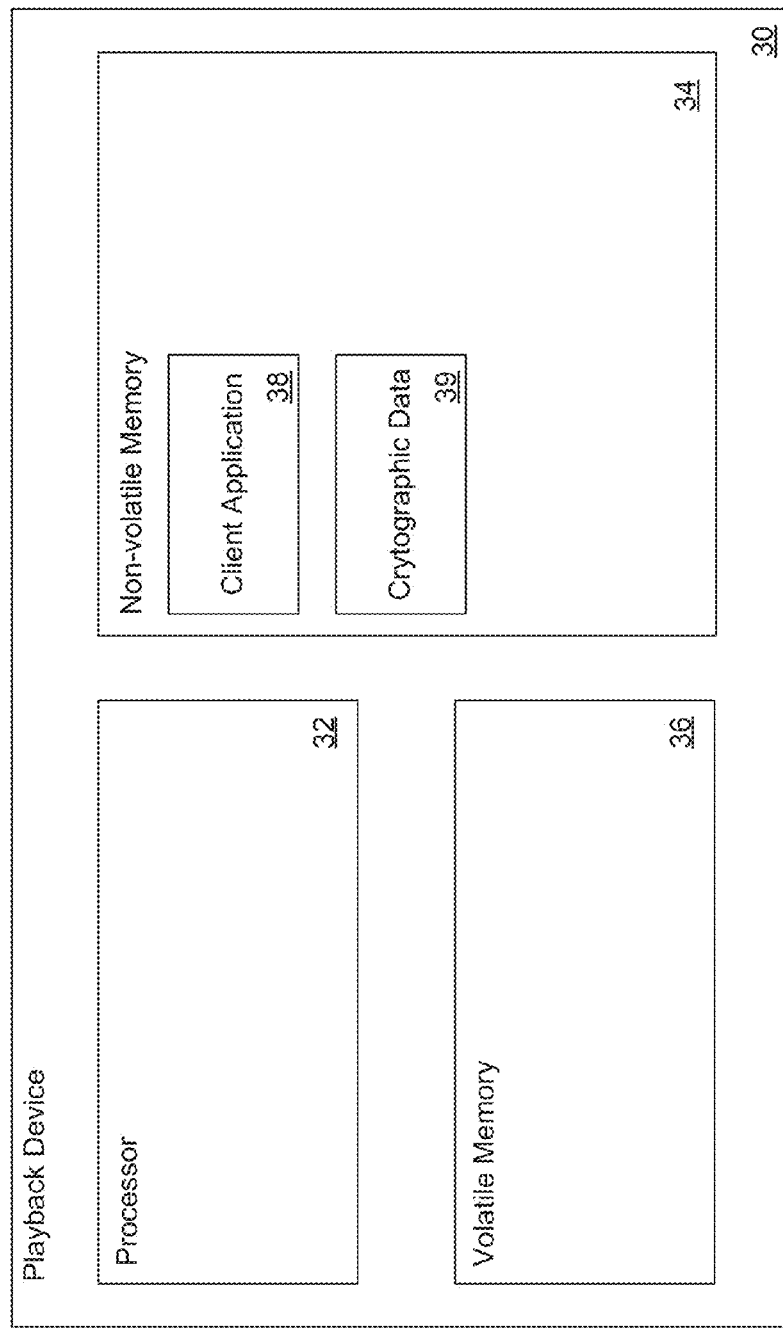
FIG. 2 is a system diagram of a playback device in accordance with an embodiment of the invention.

In the embodiment illustrated in FIG. 1, playback devices include personal computers, CE players, and mobile phones. In other embodiments, playback devices can include consumer electronics devices such as DVD players, Blu-ray players, televisions, set top boxes, video game consoles, tablets, and other devices that are capable of connecting to a server and playing back encoded media. The basic architecture of a playback device in accordance with an embodiment of the invention is illustrated in FIG. 2. The playback device 30 includes a processor 32 in communication with non-volatile memory 34 and volatile memory 36. In the illustrated embodiment, the non-volatile memory includes a client application 38 that configures the processor and the playback device to stream content from a remote server. The non-volatile memory 34 also includes cryptographic data 39 that can be utilized in accessing encrypted content. During operation, the client application can configure the playback device to measure network bandwidth. In many embodiments, the time taken to receive a requested block of data is used to measure network bandwidth. Network bandwidth measurements can be performed throughout a streaming session and can include information concerning the content distribution network and/or server from which the playback device requested the block of content. In many embodiments, the client application configures the playback device to record the specific stream requested. The client application can configure the playback device to store the network bandwidth measurements in the volatile or non-volatile memory of the playback device. In addition, the client application can configure the playback device to transmit the network bandwidth measurements to a performance server. The playback device can transmit network bandwidth measurements to a performance server as they are made and/or the playback device can buffer network bandwidth measurements and send them in batches to the performance server. Where bandwidth measurements are locally stored, the client application 38 can utilize the bandwidth measurements in making an initial stream selection(s). Where bandwidth measurements are provided to a performance server, the client application 38 configures the playback device to request an initial bandwidth estimate and/or accuracy information from the performance server.

In a number of embodiments, the playback device is configured to perform adaptive bitrate streaming. In several embodiments, a top level index file is stored and/or generated by a server within the content distribution network 14 or a server associated with the online content store 22. The top level index file specifies the alternative streams available to the playback device and the maximum bitrate of each stream. Therefore, a performance server and/or a playback device can utilize the index file to perform initial stream selections based upon a bandwidth estimate generated in accordance with embodiments of the invention. Examples of adaptive bitrate streaming systems that can be utilized in accordance with embodiments of the invention include but are not limited to the adaptive bitrate streaming systems disclosed in U.S. Provisional Patent Application Ser. No. 61/430,110, "Systems and Methods For Adaptive Bitrate Streaming of Media Stored in Matroska Files Using Hypertext Transfer Protocol", filed Jan. 5, 2011, the entirety of which is incorporated herein by reference.

Although a specific playback device architecture is illustrated in FIG. 2, any of a variety of architectures including architectures where the client application is located on disk or some other form of storage and is loaded into volatile memory at runtime can be utilized to implement playback devices for use in multiphase adaptive bitrate streaming systems in accordance with embodiments of the invention. Furthermore, any of a variety of system architectures including (but not limited) to the system architecture illustrated in FIG. 1 can be utilized to measure network bandwidth and utilize the network bandwidth measurements to estimate network bandwidth when a playback device initiates a streaming session in accordance with embodiments of the invention.

Measuring Network Bandwidth

Figure 3:
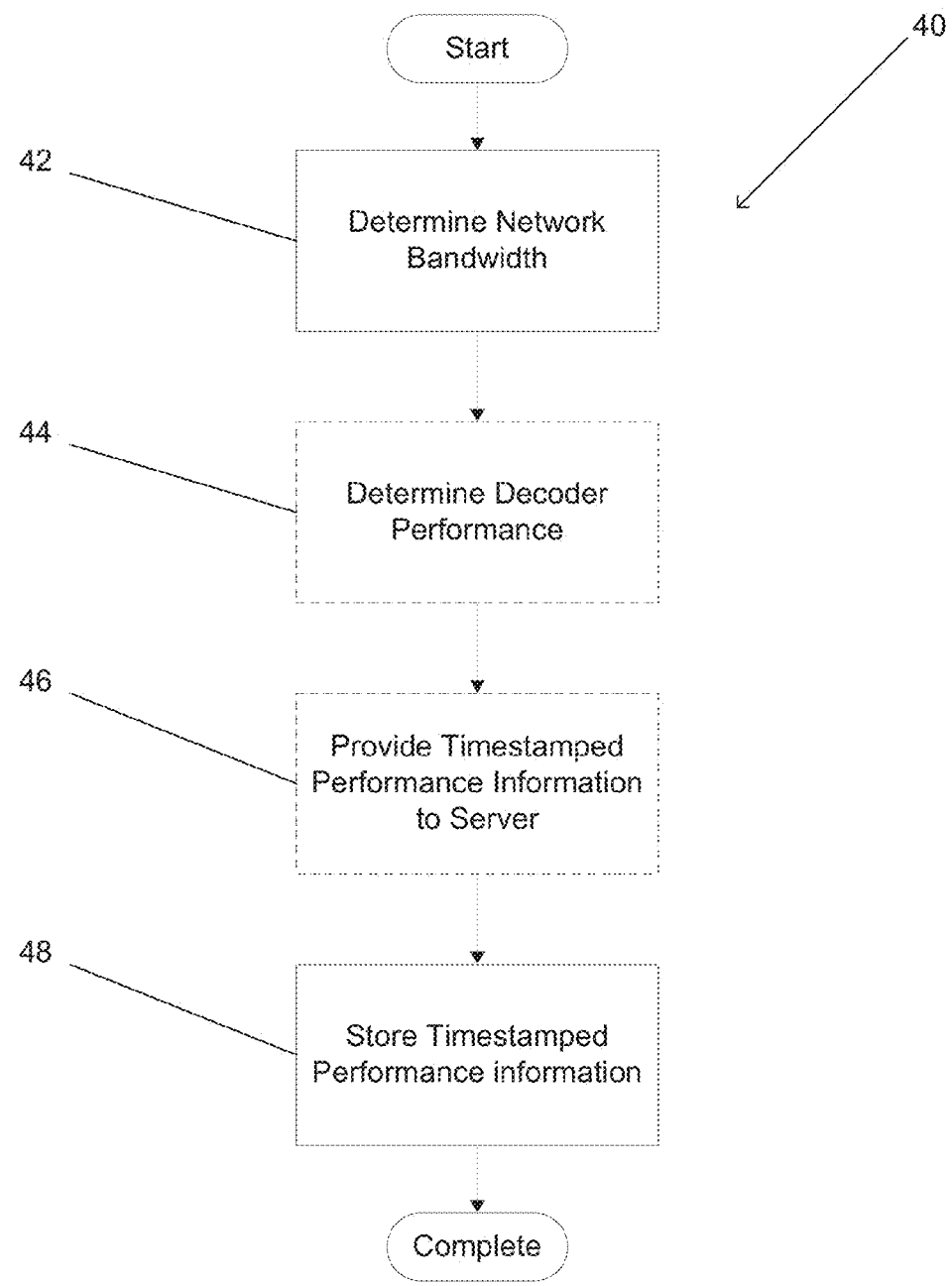
FIG. 3 is a flow chart illustrating a process for measuring network bandwidth in accordance with an embodiment of the invention.

Any of a variety of processes can be utilized to measure network bandwidth and decoder performance. A process for measuring network performance in accordance with an embodiment of the invention is illustrated in FIG. 3. The process 40 includes determining (42) network bandwidth. As discussed above, one process for determining network bandwidth or data rate is to request a block of data and to measure the time taken to download the data. In other embodiments, any of a variety of techniques for measuring network bandwidth can be utilized. In several embodiments, decoder performance is also measured (44). Decoder performance can be measured in any of a variety of different ways including measuring the time it takes to decode a frame of video, the average time taken to decode a frame of video, and/or CPU load. When the playback device performing the bandwidth measurements provides the bandwidth measurements to a performance server, the playback device can send (46) the timestamped information to the performance server and can include additional information including (but not limited to) the IP address or host name of the server from which the stream was received, the size of the data downloaded, and/or the maximum bitrate at which the stream is encoded. The timestamped performance information can then be stored (48) for retrieval and use in the estimation of available bandwidth.

Although a specific process for estimating network bandwidth is illustrated in FIG. 3, any of a variety of processes appropriate to a specific application can be utilized in accordance with embodiments of the invention. Once the network bandwidth measurements are collected, estimation of available bandwidth can be performed either at the playback device or using a performance server. Processes for estimating available bandwidth in accordance with embodiments of the invention are discussed below.

Estimating Network Bandwidth

Figure 4:
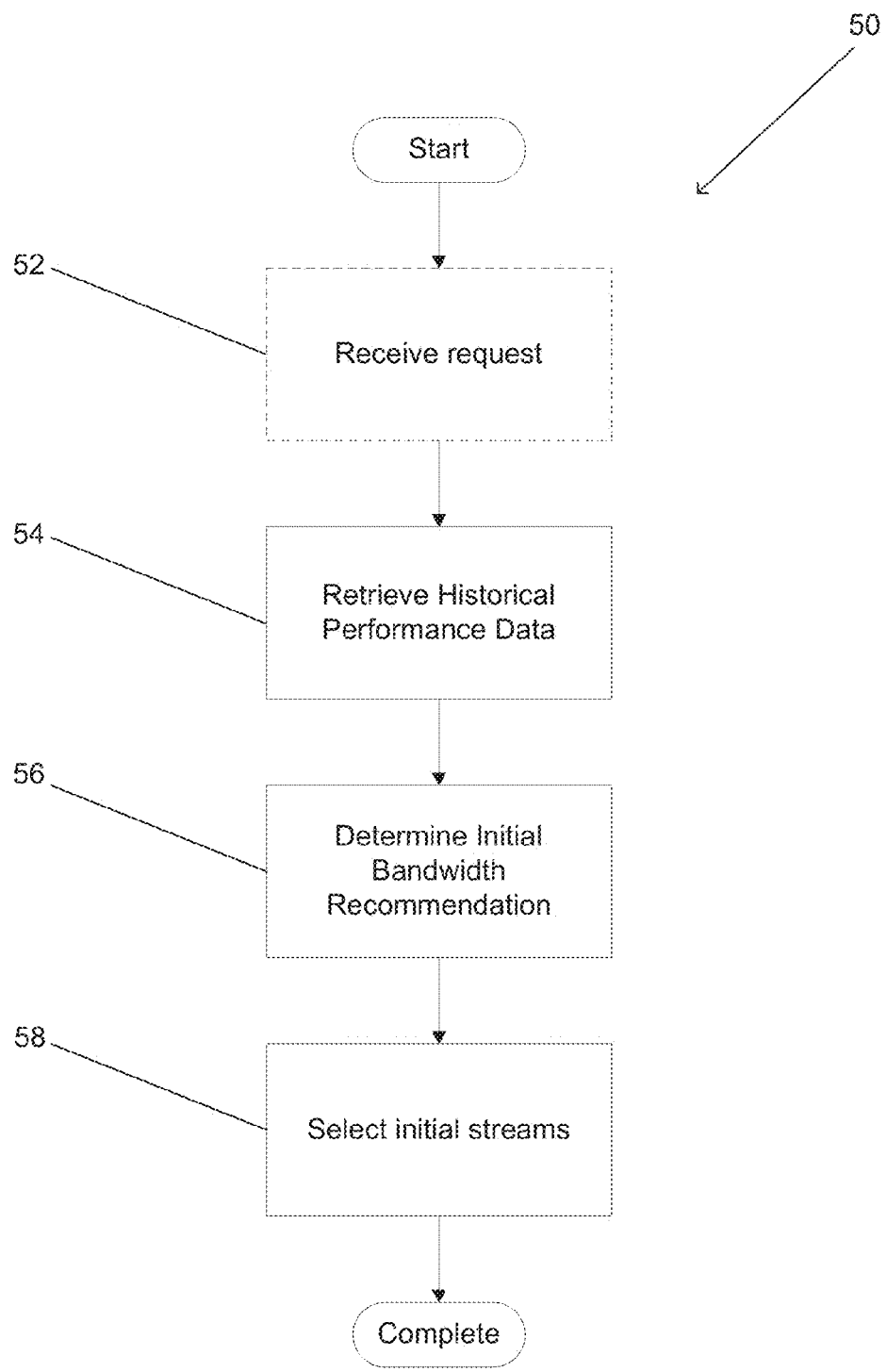
FIG. 4 is a flow chart illustrating a process for estimating network bandwidth using historical network bandwidth measurements in accordance with an embodiment of the invention.

Historical network bandwidth measurements can be utilized to select one or more initial streams when streaming content. A process for generating a bandwidth estimate using historical network bandwidth measurements in accordance with embodiments of the invention is illustrated in FIG. 4. The process 50 can be performed using a playback device, a performance server or a combination of a playback device and a performance server. When a performance server is utilized in the process, the process commences with the receipt (52) of a network bandwidth estimate request. The network bandwidth estimate is determined by retrieving (54) historical performance data and using the historical performance data to generate (56) an initial bandwidth recommendation. In a number of embodiments, the initial bandwidth recommendation is generated by averaging network bandwidth measurements included in the performance data. In several embodiments, network bandwidth measurements collected over a predetermined time period are averaged. In many embodiments, the network bandwidth measurements that occurred within a corresponding time of day and/or day of the week are averaged. In certain embodiments, network bandwidth measurements taken when content was streamed from a specific content distribution network and/or server are averaged. In other embodiments, the network bandwidth measurements and associated data can be filtered in any of a variety of ways to determine an initial bandwidth estimate. In a number of embodiments, the process of generating an initial bandwidth estimate also includes generating an estimate of the accuracy of the bandwidth estimate. In several embodiments, the accuracy of the bandwidth estimate can be determined as the ratio of previous bandwidth estimates to actual bandwidth or as a statistical measure such as (but not limited to) the standard deviation of the network bandwidth measurements utilized to generate the initial bandwidth estimate. In other embodiments, any of a variety of techniques can be utilized to determine the accuracy of an initial bandwidth estimate including (but not limited to) looking at trends for certain times of day. When the initial bandwidth estimate has been obtained, initial stream(s) are selected (58).

Although a specific process is illustrated in FIG. 4, any of a variety of processes for generating an initial bandwidth estimate and selecting streams can be utilized in accordance with embodiments of the invention. Processes for performing stream selection based upon an initial bandwidth estimate in accordance with embodiments of the invention are discussed further below.

Selecting Initial Steams

Figure 5:
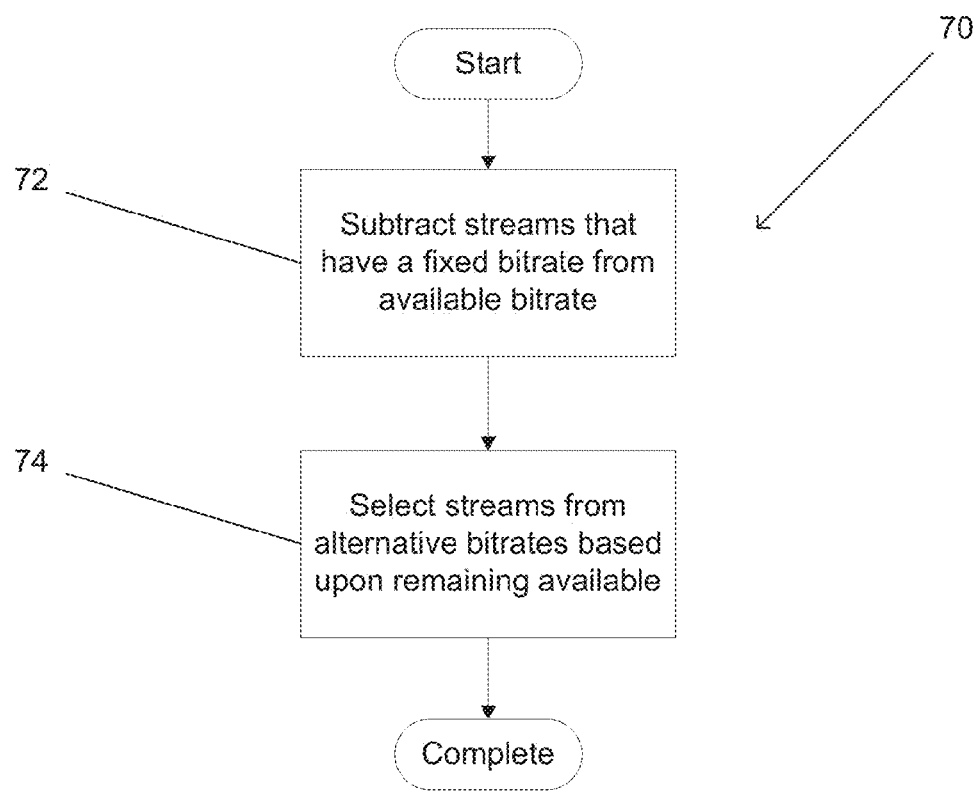
FIG. 5 is a flow chart illustrating a process for performing initial stream selection.

When an estimate of the available bandwidth or bitrate has been obtained, a playback device can select one or more initial streams and commence streaming of the encoded content. A process for selecting initial stream(s) in accordance with an embodiment of the invention is illustrated in FIG. 5. When encoding content for adaptive bitrate streaming or conventional streaming at different resolutions, the source video is typically encoded as a number of alternative streams. Other portions of the source content, however, may simply be provided as a single stream (e.g. a specific audio track or a specific subtitle track). In the illustrated embodiment, the process 70 involves initially allocating bandwidth (72) to streams for which there are no alternatives. In many embodiments, bandwidth is initially allocated to streams for which there is no alternative and so the maximum bitrate is a fixed value. The total bitrate allocated to these fixed streams is then subtracted from the estimated available bitrate to obtain the remaining available bitrate for use by other streams. A selection (74) can then be made concerning alternative streams based upon the remaining available bandwidth. Where there are multiple sets of alternative streams from which selections can be made (e.g. multiple video streams encoded at different bitrates and multiple audio streams encoded at different bitrates), a tradeoff occurs between which stream will be allocated the greater share of the available bandwidth. In a number of embodiments, the playback device makes a predetermined selection. In many embodiments, the predetermined selection is made based upon the available bandwidth and the maximum bitrates of the streams within the two sets of alternative streams. In several embodiments, the user can force the selection of a higher bitrate stream (e.g. the user can chose to force the selection of a higher rate video stream or a higher rate audio stream). Once the initial streams are selected, the playback device can commence requesting portions of encoded media from the initial streams and, in adaptive bitrate systems, can adjust the stream selections based upon the streaming conditions experienced by the playback device.

Although a specific process for selecting initial streams based upon an initial bandwidth estimate is discussed above with respect to FIG. 5, any of a variety of processes can be utilized to select initial streams based upon an initial bandwidth estimate in accordance with embodiments of the invention. In many embodiments, the initial bandwidth estimate is used as a conservative estimate and an adjustment factor can be applied to the initial bandwidth estimate. In several embodiments, the adjustment factor is a function of the accuracy of the initial bandwidth estimate. In other embodiments, any of a variety of techniques can be utilized to apply an adjustment factor to the initial bandwidth estimate. Indeed, in many embodiments an adjustment is made during the process of determining the initial bandwidth estimate.

Premium Content Recommendations

Many content distribution systems charge a premium for higher resolution content, which is typically encoded at a higher maximum bitrate relative to lower resolution content. At the time of purchase, however, information is typically not available concerning the data rate of a network connection that can be established between the content distribution system and a playback device. In many instances, purchase of higher resolution content may result in an inferior playback experience due to repeated interruptions to buffer content. In adaptive bitrate streaming systems, insufficient network bandwidth may cause the majority of the video streamed to a playback device to be at a lower resolution than the resolution paid for by a user. Initial bandwidth estimates generated using stored network bandwidth measurements can be utilized to make recommendations concerning whether a user's playback device and network connection can support playback at a specific resolution.

Figure 6:
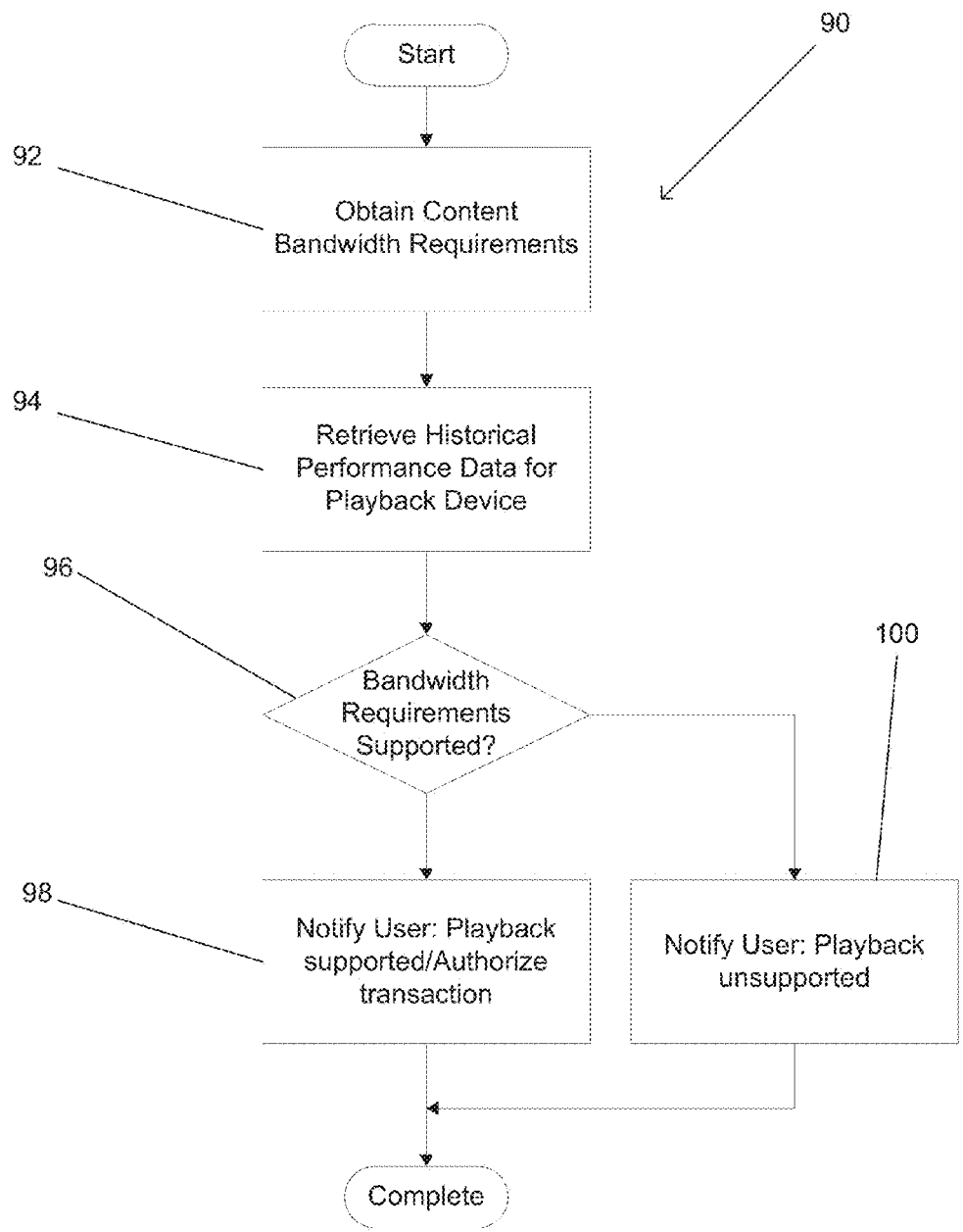
FIG. 6 is a flow chart illustrating a process for determining whether a playback device can support playback of a particular piece of content based upon the maximum bitrate at which the piece of content is encoded in accordance with an embodiment of the invention.

A process for determining whether a playback device can support playback of a piece of content at a specific resolution in accordance with an embodiment of the invention is illustrated in FIG. 6. The process 90 can be performed using a performance server or using a playback device. The process 90 commences by obtaining (92) the bandwidth requirements of a specific piece of content. Historical network bandwidth measurements are retrieved (94) and a determination made concerning whether playback is supported. The determination concerning whether playback is supported can be made in any of a variety of ways. Where a specific stream of content is concerned, a determination can be made based upon the proportion of time spent buffering content during playback of content encoded at a similar maximum bitrate. In several embodiments, network bandwidth measurements can be reviewed to estimate the bandwidth throughout playback to estimate the proportion of time that is likely to be spent buffering content. In a number of embodiments, modifications can be made to the amount of content that is buffered before playback commences based upon the bandwidth estimates to reduce the amount of time spent buffering during playback. In adaptive bitrate streaming systems, a determination can be made based upon the proportion of time spent streaming at or above the maximum bitrate of the content. Estimates of the network bandwidth for the duration of the content can also be utilized to estimate the proportion of time content at the specified resolution will be streamed.

As is the case with the initial bandwidth estimates discussed above, the network bandwidth measurements utilized to determine whether the bandwidth requirements of the content are supported can be filtered based upon one or more pieces of additional information associated with the network measurements including (but not limited to) time of day, date, and the content distribution network and/or server streaming the content. In many embodiments, the determination concerning whether the network bandwidth requirements are supported can be accompanied by a confidence factor or accuracy metric. In several embodiments, the confidence factor or accuracy metric can represent the proportion of time that is likely to be spent buffering or streaming at a lower resolution or reflect variation in the network bandwidth measurement data utilized to determine whether the network bandwidth requirements of the content can be supported. When the network bandwidth requirements can be met, the process 90 can involve generating (98) a user notification that the playback requirements can be met and/or authorizing the transaction. In embodiments where a performance server makes the determination, the determination can be integrated within the user interface of a content distribution system and/or the determination can be integrated into the purchase process. In the event a determination is made that the network bandwidth requirements of a specific content resolution exceed the data rate that is likely to be available to a playback device, then a notification is generated (100) informing the user that they should not proceed with purchasing and/or streaming the content.

Although a specific process is illustrated in FIG. 6, any of a variety of processes for determining whether to stream and/or purchase a specific piece of content encoded with specific maximum bandwidth requirements including processes that utilize network bandwidth measurements collected by multiple playback devices from a similar geographic region and that utilize the same Internet service provider can be performed in accordance with embodiments.

In several embodiments, a similar process is utilized to generate the number of interruptions and the amount of time spent buffering during playback, which can be displayed accompanying content selections. In adaptive bitrate streaming systems, similar processes can be used to estimate the proportion of time the content will be streamed at the displayed resolution. In both instances these estimates can be qualified by high end and low end estimates representing a predetermined confidence interval. In addition to making determinations concerning whether to purchase and/or stream a specific piece of content, network bandwidth measurements can be utilized in a variety of additional ways related to the purchase of content discussed below.

Content Distribution Network Recommendations

The data rate of a network connection experienced by a specific playback device can vary depending upon the content distribution network utilized to distribute content. In a number of embodiments, a content distribution system can offer premium content based not just on the resolution of the content but the content distribution network utilized to deliver the content. In many embodiments, a streaming system can provide a performance metric such as (but not limited to) an estimate of the amount of time the playback device will spend buffering during playback from different content distribution networks and can charge a premium based the higher playback performance anticipated when streaming from a premium content distribution network. In several embodiments, an adaptive bitrate streaming system can display a performance metric such as (but not limited to) an estimate of the proportion of time that a playback device will receive content encoded at the highest available resolution and charge a premium based upon the higher playback performance anticipated when streaming from a premium content distribution network.

Although the present invention has been described in certain specific aspects, many additional modifications and variations would be apparent to those skilled in the art. It is therefore to be understood that the present invention may be practiced otherwise than specifically described, including various changes in the implementation such as utilizing encoders and decoders that support features beyond those specified within a particular standard with which they comply, without departing from the scope and spirit of the present invention. Thus, embodiments of the present invention should be considered in all respects as illustrative and not restrictive.

What is claimed:

1. A method of selecting an initial stream of encoded media from a plurality of streams of encoded media that are encoded at different maximum bitrates rates, the method comprising:
    measuring network bandwidth using a playback device;
    determining, prior to commencing streaming of encoded media, an initial network bandwidth estimate using the network bandwidth measurements, wherein the initial network bandwidth estimate is determined by filtering the network bandwidth measurements based upon at least one piece of information associated with the network bandwidth measurements selected from the group consisting of time of day, day of week, content distribution network, server, and maximum bitrate;
    selecting an initial stream from said plurality of streams of encoded media that are encoded at different maximum bitrates rates using the playback device for commencing streaming of encoded media based upon the maximum bitrates of the plurality of streams and the initial network bandwidth estimate, where the initial stream is selected by initially allocating available bandwidth to streams which have no alternative and allocating the remaining bandwidth to the selection from the plurality of streams of encoded media that are encoded at different maximum bitrates; and
    commencing streaming of encoded media by requesting portions of the encoded media from the streams which have no alternative and the selected initial stream using the playback device.

2. The method of claim 1, wherein the playback device performs the initial network bandwidth estimate using the network bandwidth measurements.

3. The method of claim 1, further comprising:
    providing the network bandwidth measurements to a performance server;
    wherein the performance server determines the initial network bandwidth estimate using the network bandwidth measurements.

4. The method of claim 1, wherein measuring network bandwidth comprises requesting a block of data and measuring the time taken to download the data.

5. The method of claim 1, wherein measuring network bandwidth comprises associating a timestamp with the network bandwidth measurement.

6. The method of claim 1, wherein measuring network bandwidth comprises associating a content distribution network identifier with the network bandwidth measurement.

7. The method of claim 1, wherein measuring network bandwidth comprises associating a server IP address with the network bandwidth measurement.

8. The method of claim 1, wherein measuring network bandwidth comprises associating a server hostname with the network bandwidth measurement.

9. The method of claim 1, wherein measuring bandwidth comprises associating a video maximum bitrate with the network bandwidth measurement.

10. The method of claim 1, wherein determining an initial network bandwidth estimate using the network bandwidth measurements comprises determining an average network bandwidth using the network bandwidth measurements.

11. The method of claim 1, wherein determining an initial network bandwidth estimate using the network bandwidth measurements further comprises determining the accuracy of the initial bandwidth estimate.

12. The method of claim 1, wherein the initial stream is selected for use in the adaptive bitrate streaming of the encoded media.

13. The method of claim 1, further comprising selecting a stream from each of a number of sets of streams of encoded media that are encoded at different maximum bitrates.

14. The method of claim 1, wherein the user can instruct the playback device concerning allocation of bandwidth to at least one of the selections subject to the remaining available bandwidth.

15. A playback device configured to select an initial stream from a plurality of streams of encoded media that are encoded at different maximum bitrates, the playback device comprising:
    a processor configured, via a client application, to request portions of files from a remote server;
    wherein the client application further configures the processor to:
        measure network bandwidth using a playback device;
        obtain, prior to commencing streaming of encoded media, an initial network bandwidth estimate using the network bandwidth measurements, wherein the initial network bandwidth estimate is determined by filtering the network bandwidth measurements based upon at least one piece of information associated with the network bandwidth measurements selected from the group consisting of time of day, day of week, content distribution network, server and maximum bitrate;

select an initial stream from said plurality of streams of encoded media that are encoded at different maximum bitrates rates for commencing streaming of encoded media based upon the maximum bitrates of the plurality of streams and the initial network bandwidth estimate, where the initial stream is selected by initially allocating available bandwidth to streams which have no alternative and allocating the remaining bandwidth to the selection from the plurality of streams of encoded media that are encoded at different maximum bitrates; and commence streaming of encoded media by requesting portions of the encoded media from the streams which have no alternative and the selected initial stream using the playback device.

16. The playback device of claim 15, wherein the client application further configures the processor to measure network bandwidth by requesting a block of data and measuring the time taken to download the data.

17. The playback device of claim 15, wherein the client application further configures the processor to associate a timestamp with the network bandwidth measurement.

18. The playback device of claim 15, wherein the client application further configures the processor to associate a content distribution network identifier with the network bandwidth measurement.

19. The playback device of claim 15, wherein the client application further configures the processor to associate a server IP address with the network bandwidth measurement.

20. The playback device of claim 15, wherein the client application further configures the processor to associate a server host name with the network bandwidth measurement.

21. The playback device of claim 15, wherein the client application further configures the processor to associate a video maximum bitrate with the network bandwidth measurement.

22. The playback device of claim 15, wherein the client application further configures the processor to associate the playback device IP address with the network bandwidth measurement.

23. The playback device of claim 15, wherein the client application further configures the processor to perform an initial network bandwidth estimate using the network bandwidth measurements.

24. The playback device of claim 23, wherein the client application further configures the processor to determine an initial network bandwidth estimate using the network bandwidth measurements by determining an average network bandwidth using the network bandwidth measurements.

25. The playback device of claim 23, wherein the client application further configures the processor to determine the accuracy of the initial network bandwidth estimate.

26. The playback device of claim 15, wherein the client application further configures the processor to:

provide the network bandwidth measurements to a performance server; and receive an initial network bandwidth estimate from the performance server.

27. The playback device of claim 15, wherein the initial stream is selected for use in the adaptive bitrate streaming of the encoded media.

28. The playback device of claim 15, wherein the client application further configures the processor to select a stream from each of a number of sets of streams of encoded media that are encoded at different maximum bitrates.

29. A non-transitory machine readable medium containing processor instructions, where execution of the instructions by a processor causes the processor to perform a process comprising:

measuring network bandwidth using a playback device;

obtaining, prior to commencing streaming of encoded media, an initial network bandwidth estimate using the network bandwidth measurements, wherein the initial network bandwidth estimate is determined by filtering the network bandwidth measurements based upon at least one piece of information associated with the network bandwidth measurements selected from the group consisting of time of day, day of week, content distribution network, server, and maximum bitrate;

selecting an initial stream from said plurality of streams of encoded media that are encoded at different maximum bitrates rates for commencing streaming of encoded media based upon the maximum bitrates of the plurality of streams and the initial network bandwidth estimate, where the initial stream is selected by initially allocating available bandwidth to streams which have no alternative and allocating the remaining bandwidth to the selection from the plurality of streams of encoded media that are encoded at different maximum bitrates; and commencing streaming of encoded media by requesting portions of the encoded media from the streams which have no alternative and the selected initial stream using the playback device.

30. The non-transitory machine readable medium of claim 29, where execution of the instructions by a processor causes the process to obtain an initial network bandwidth estimate by calculating an initial bandwidth estimate using the network bandwidth measurements.

31. The non-transitory machine readable medium of claim 29, where execution of the instructions by a processor causes the process to obtain an initial network bandwidth estimate by:

transmitting the network bandwidth measurements to a server; and receiving an initial network bandwidth estimate from the server.

32. The method of claim 1, wherein the initial network bandwidth estimate is determined by filtering the network bandwidth measurements based upon the time of day.

33. The method of claim 1, wherein the initial network bandwidth estimate is determined by filtering the network bandwidth measurements based upon the day of week.

34. The method of claim 1, wherein the initial network bandwidth estimate is determined by filtering the network bandwidth measurements based upon the content distribution network.

35. The method of claim 1, wherein the initial network bandwidth estimate is determined by filtering the network bandwidth measurements based upon the maximum bitrate.

36. The method of claim 1, wherein the initial network bandwidth estimate is determined by filtering the network bandwidth measurements based upon the time of day and the content distribution network.

37. The playback device of claim 15, wherein the client application further configures the processor to determine an initial network bandwidth estimate using the network bandwidth measurements by filtering the network bandwidth measurements based upon the time of day and the content distribution network.

38. The non-transitory machine readable medium of claim 29, wherein the initial network bandwidth estimate is determined by filtering the network bandwidth measurements based upon the time of day and the content distribution network.

* * * * *